United States Patent
Li et al.

(10) Patent No.: US 9,479,371 B2
(45) Date of Patent: Oct. 25, 2016

(54) SCHEDULING MESSAGES USING MIXED MODULATION SETTINGS

(71) Applicant: NXP B.V., Eindhoven (NL)

(72) Inventors: Hong Li, Eindhoven (NL); Arie Koppelaar, Eindhoven (NL); Ahmet Ozgur, Eindhoven (NL)

(73) Assignee: NXP B.V., Eindhoven (NL)

( * ) Notice: Subject to any disclaimer, the term of this patent is extended or adjusted under 35 U.S.C. 154(b) by 80 days.

(21) Appl. No.: 14/337,951

(22) Filed: Jul. 22, 2014

(65) Prior Publication Data

US 2016/0028569 A1   Jan. 28, 2016

(51) Int. Cl.
  *H04L 12/801* (2013.01)
  *H04L 27/00* (2006.01)
  *H04L 29/08* (2006.01)
  *H04W 28/08* (2009.01)

(52) U.S. Cl.
  CPC ........... *H04L 27/0008* (2013.01); *H04L 47/12* (2013.01); *H04L 67/12* (2013.01); *H04W 28/08* (2013.01)

(58) Field of Classification Search
  CPC ... G08G 1/0112; G08G 1/161; H04W 4/046; H04W 72/0446; H04W 72/00; H04W 28/042; H04W 4/008; H04W 4/20; H04L 67/12
  See application file for complete search history.

(56) References Cited

U.S. PATENT DOCUMENTS

| | | | | |
|---|---|---|---|---|
| 2010/0067379 A1* | 3/2010 | Zhao | ..................... | H04L 41/147 370/235 |
| 2011/0205943 A1* | 8/2011 | Grimm | ................. | H04L 1/0003 370/310 |
| 2015/0296411 A1* | 10/2015 | Meyer | .................. | G08G 1/0112 370/336 |

FOREIGN PATENT DOCUMENTS

WO   WO-2010/019603 A1   2/2010

OTHER PUBLICATIONS

ETSI TR 102 861, ITS STDMA recommended parameters and setting for cooperative ITS: Access Layer Part, Jan. 2012.
ETSI TS 102 687 V1.1.1, ITS Decentralized Congestion Control Mechanisms for Intelligent Transport Systems operating in the 5Ghz range, Access layer part, Jul. 2011.
Daniel Jiang, "Optimal Data Rate Selection for Vehicle Safety Communications",ACM Vanet 08, Sep. 15, 2008.
Paul Alexander, "Cooperative Intelligent Transport Systems:5:9 Ghz Field Trails, Proceedings of the IEEE", vol. 99, No. 7, Jul. 2011.
Extended European Search Report for Patent Appln. No. 15177619.2 (Nov. 27, 2015).

* cited by examiner

*Primary Examiner* — Jae Y Lee (57) ABSTRACT

Various exemplary embodiments relate to a wireless communications device and related method and machine-readable storage medium including: at least one antenna; a transmission circuit to transmit data via the at least one antenna and a wireless communications medium according to any of a plurality of modulation schemes; a reception circuit to receive data via the at least one antenna; an application controller to generate a series of messages having a message type and associated with an application; and a message scheduler to provide modulation settings to the transmission circuit for respective messages of the series to be transmitted according to different modulation schemes of the plurality of modulation schemes, wherein modulation schemes are chosen for transmission based on a modulation scheme pattern, whereby a first message is transmitted according to a first modulation scheme and a second message is transmitted according to a second modulation scheme.

20 Claims, 4 Drawing Sheets

SCHEDULING MESSAGES USING MIXED MODULATION SETTINGS

TECHNICAL FIELD

Various exemplary embodiments disclosed herein relate generally to wireless communications and, more particularly but not exclusively, to wireless communication in intelligent transportation systems (ITS).

BACKGROUND

Intelligent transportation systems (ITS) are emerging for improving road safety by broadcasting real-time information regarding vehicles in the area. According to some ITS implementations, vehicles set-up a vehicular ad-hoc network (VANET) based on IEEE 802.11p dedicated short-range communications (DSRC) to exchange position, speed, road condition, or event/accident information between nearby vehicles. In some applications, such as implementations according to the European Telecommunications Standards Institute (ETSI) ITS standards, vehicles periodically broadcast common awareness messages (CAMs) at a rate of 10 Hz to report information such as current speed and position in the control channel.

In many situations, however, the continual broadcast of CAMs and other messages at this high message rate by large number of vehicles in the area will lead to a congested wireless communications medium. In particular, with a large amount of data traffic, the interference on the medium will rise and, consequently, so will the error rate in received messages and the channel access delay due to a higher frequency in raising the medium busy flag. The relevant standards suggest that in areas of high congestion, the participant vehicles should reduce the rate of CAM and other message broadcast below 10 Hz or reduce transmission power to free up the medium.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various embodiments described herein relate to a method performed by a wireless communications device for transmitting a series of messages, the method including: generating, by the wireless communications device, a first message having a message type and associated with an application; transmitting the first message toward at least one other device via a wireless communications medium according to a first modulation scheme wherein the first modulation scheme is chosen based on a modulation scheme pattern; generating, by the wireless communications device, a second message having the message type associated with the application, the first message and the second message having the same message type; transmitting the second message toward the at least one other device via the wireless communications medium according to a second modulation scheme that is different from the first modulation scheme wherein the second modulation scheme is chosen based on the modulation scheme pattern.

Various embodiments described herein relate to a machine-readable storage medium encoded with instructions for execution by a wireless communications device, the medium including instructions for generating, by the wireless communications device, a first message having a message type and associated with an application; instructions for transmitting the first message toward at least one other device via a wireless communications medium according to a first modulation scheme wherein the first modulation scheme is chosen based on a modulation scheme pattern; instructions for generating, by the wireless communications device, a second message having the message type associated with the application, the first message and the second message having the same message type; instructions for transmitting the second message toward the at least one other device via the wireless communications medium according to a second modulation scheme that is different from the first modulation scheme wherein the second modulation scheme is chosen based on the modulation scheme pattern.

Various embodiments described herein relate to a wireless communications device for transmitting a series of messages, the wireless communications device including: at least one antenna; a transmission circuit configured to transmit data via the at least one antenna and a wireless communications medium according to any of a plurality of modulation schemes; a reception circuit configured to receive data via the at least one antenna; an application controller configured to generate a series of messages having a message type and associated with an application; and a message scheduler configured to provide modulation settings to the transmission circuit for respective messages of the series of messages to be transmitted according to different modulation schemes of the plurality of modulation schemes wherein modulation schemes are chosen for transmission based on a modulation scheme pattern, whereby a first message of the series of messages is transmitted according to a first modulation scheme and a second message of the series of messages is transmitted according to a second modulation scheme.

Various embodiments are described wherein the application is an intelligent transportation system and the message type is a common awareness message.

Various embodiments are described wherein the first and second modulation schemes are both selected from the group consisting of: binary phase-shift keying, quadrature phase-shift keying, 16-value quadrature amplitude modulation (16-QAM), and 64-value quadrature amplitude modulation (64-QAM).

Various embodiments additionally include generating, by the wireless communications device, a third message having the message type associated with the application, the first message and the third message having the same message type; and transmitting the third message toward the at least one other device via a wireless communications medium according to a third modulation scheme that is different from the first modulation scheme and the second modulation scheme.

Various embodiments are described wherein the second modulation scheme is selected to have a higher data rate than the first modulation scheme.

Various embodiments additionally include storing a modulation scheme pattern that indicates, for a sequence of messages of the message type, a sequence of modulation schemes to be used for transmitting respective messages from the sequence of messages, wherein: the step of transmitting the first message toward at least one other device via a wireless communications medium according to the first modulation scheme is performed based on determining, from the modulation scheme pattern, that the first modulation scheme is the next modulation scheme to be used; and the step of transmitting the second message toward the at least one other device via the wireless communications medium according to the second modulation scheme is performed based on determining, from the modulation scheme pattern, that the second modulation scheme is the next modulation scheme to be used.

Various embodiments additionally include determining a current load on the wireless communications medium; and selecting a new modulation scheme pattern based on the current load Various embodiments are described wherein selecting a new modulation scheme pattern includes retrieving a previously defined modulation scheme pattern based on the current load.

Various embodiments are described wherein selecting a new modulation scheme pattern includes: comparing the current load to a target load; and modifying the current modulation scheme pattern based on the outcome of comparing the current load to the target load to generate the new modulation scheme pattern.

Various embodiments additionally include periodically analyzing received messages, respective modulations schemes associated with reception of the received messages, and position information carried by the received messages to determine a range associated with the first modulation scheme and the second modulation scheme in a current environment of the wireless communications device.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure or substantially the same or similar function.

DETAILED DESCRIPTION

While the standards propose a solution to medium congestion, they do so at the cost of safety. In particular, while reduction in the rate at which common awareness messages (CAMs) are broadcast will reduce the load on the medium, each participant in the intelligent transportation system (ITS) will be provided with a less accurate representation of the surrounding environment, thereby increasing the risk of vehicle collision or other accidents.

The methods described herein address the problem of medium congestion in a manner that preserves the accuracy of the CAM information used by participant vehicles. In particular, various methods described herein change the modulation scheme used for wireless transmission of CAMs prior to reducing the distance that at least some transmitted CAMs travel before the signal-to-interference-plus-noise ratio (SINR) falls enough such that the message is no longer recoverable. In this way, nearby vehicles may be provided with every CAM while the load placed on the medium is reduced near more remote vehicles that do not benefit as much from receiving every transmitted CAM.

The description and drawings presented herein illustrate various principles. It will be appreciated that those skilled in the art will be able to devise various arrangements that, although not explicitly described or shown herein, embody these principles and are included within the scope of this disclosure. As used herein, the term, "or," as used herein, refers to a non-exclusive or (i.e., and/or), unless otherwise indicated (e.g., "or else" or "or in the alternative"). Additionally, the various embodiments described herein are not necessarily mutually exclusive and may be combined to produce additional embodiments that incorporate the principles described herein.

Figure 1:
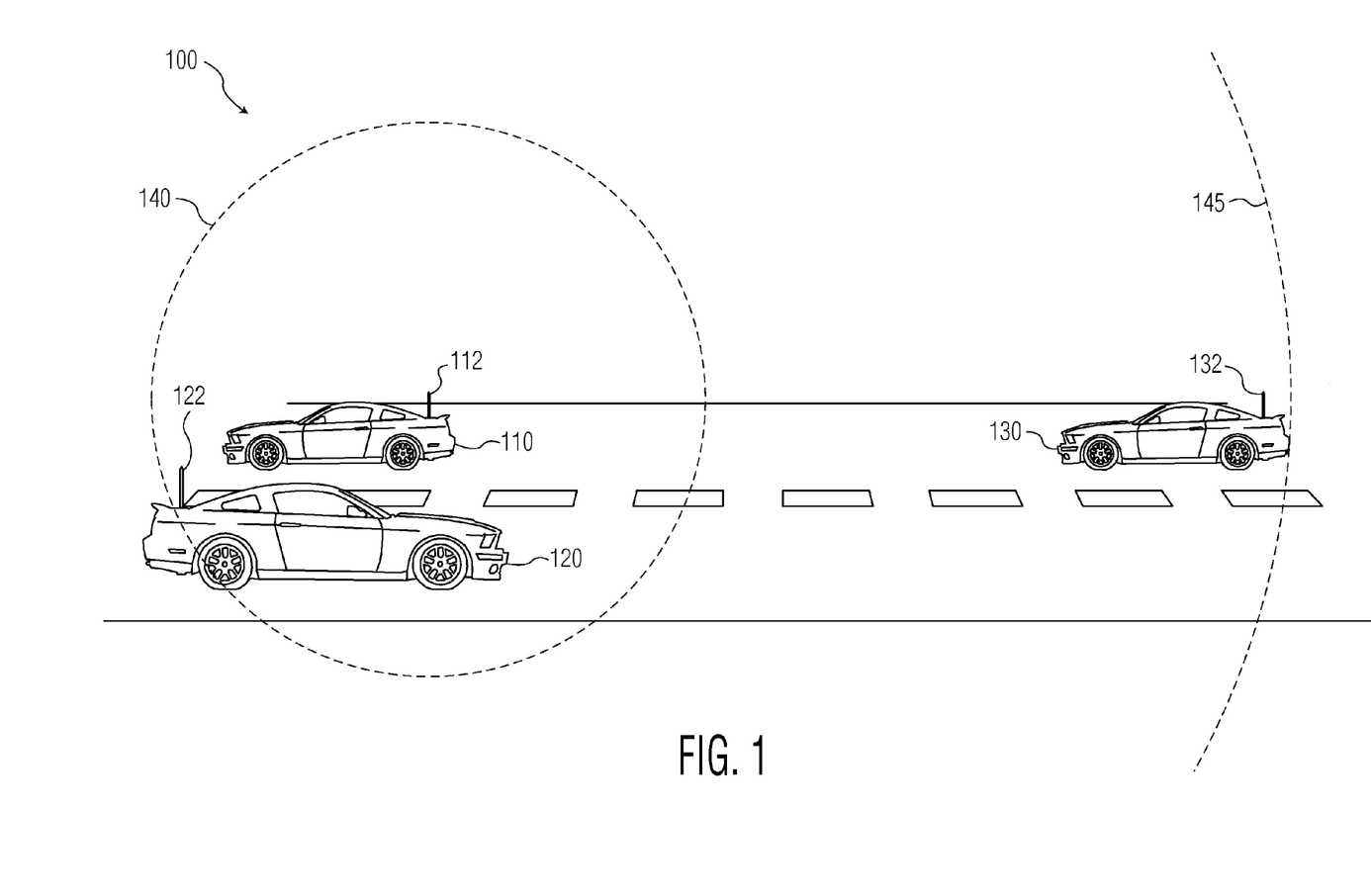
FIG. 1 illustrates an exemplary intelligent transportation system (ITS) environment for implementation of mixed modulation message scheduling.

FIG. 1 illustrates an exemplary intelligent transportation system (ITS) environment 100 for implementation of mixed modulation message scheduling. As shown, the ITS environment 100 includes three vehicles 110, 120, 130 which are each provided with a respective wireless communications device 112, 122, 132 including one or more antenna and circuitry or other hardware for enabling communication between the vehicles 110, 120, 130. It will be appreciated that fewer or greater number of vehicles may be present in the environment 100 and that diverse vehicles (e.g., cars, trucks, motorcycles, boats, aircraft, etc.) and other devices (e.g., mobile phones, pedestrian devices, roadside beacons, etc.) may participate in the environment 100.

According to various embodiments, the communications devices 112, 122, 132 periodically broadcast or otherwise exchange information with each other. For example, the communications devices 112, 122, 132 may join a vehicular ad-hoc network (VANET) and periodically broadcast CAMs to be received by the other communications devices 112, 122, 132 in the area. Such CAMs may include various information such as, for example, information identifying the current position, speed, and movement direction of the transmitting vehicle.

With numerous vehicles 110, 120, 130 periodically transmitting CAMs and other messages, the wireless communications medium is likely to become congested at times. In such situations, the vehicles 110, 120, 130 may adjust the modulation scheme used for transmitting at least some CAMs to reduce the load placed on the medium from the transmitter vehicle 110, 120, 130. As will be understood, various modulation schemes provide varying data rates and communications ranges and therefore have different contributions to the congestion of the communication mediums. As will be described in greater detail below, various embodiments of communications devices 112, 122, 132 utilize, during periods of transmission medium congestion, a pattern of modulation schemes for use in transmitting different CAMs in the sequence according to different modulation schemes and, therefore, with different communications ranges. In this way, nearby vehicles (e.g., those within the communication range of all modulation schemes used) will receive most, if not all, CAMs transmitted by the transmitting vehicle while more remote vehicles will receive only those CAMs transmitted according to sufficiently long-range modulation schemes. Receipt of only this subset of CAMs may be considered sufficient for ITS purposes because more remote vehicles are at lower risk for collision with the transmitting vehicle and thereby do not benefit as much from a fully accurate representation of the transmitting vehicle position and speed that is kept current in real-time (e.g. at 10 Hz).

For example, a transmitting vehicle communications unit 112 may be transmitting CAMs at a rate of 10 Hz and modulated according to a binary phase-shift keying (BPSK) modulation scheme. BPSK modulation may be sufficiently long-range 135 such that both of the other pictured vehicles 120, 130 are able to receive and decode these CAMS. Upon detecting that the wireless communications medium is congested, the transmitting communications unit 112 begins transmitting every other CAM according to a 16-value quadrature amplitude modulation (16-QAM) scheme, which has a higher data rate but shorter range 130 than BPSK schemes. Because vehicle 120 is relatively near the transmitting vehicle 110 and within the ranges of both BPSK and 16-QAM, the nearby communications device 122 receives most or all CAMs transmitted by the transmitting communications device 112. On the other hand, the vehicle 130 is relatively remote to the transmitting vehicle and outside the range of the 16-QAM scheme. Thus, the remote communications device 132 receives only approximately every other CAM (i.e., those CAMs that are transmitted according to the BPSK scheme). Because the remote vehicle 130 is relatively far from the transmitting vehicle 110, being updated as to the transmitting vehicle's 110 speed and position at half rate (e.g., 5 Hz) is sufficient for the purposes of ITS. If the remote vehicle 130 subsequently moves closer to the transmitting vehicle 110 such that collision risk rises, the remote vehicle 130 will also move within the range of 16-QAM and therefore begin receiving most or all of the CAM messages transmitted.

It will be apparent that various modifications to the foregoing example may be made. For example, different or additional modulation schemes may be used such as quadrature phase-shift keying (QPSK), 64-value QAM (64-QAM), frequency modulation, or virtually any other wireless communications modulation scheme. Further, different patterns may be used than that described in the example, some of which are described in greater detail with respect to FIG. 4.

Figure 2:
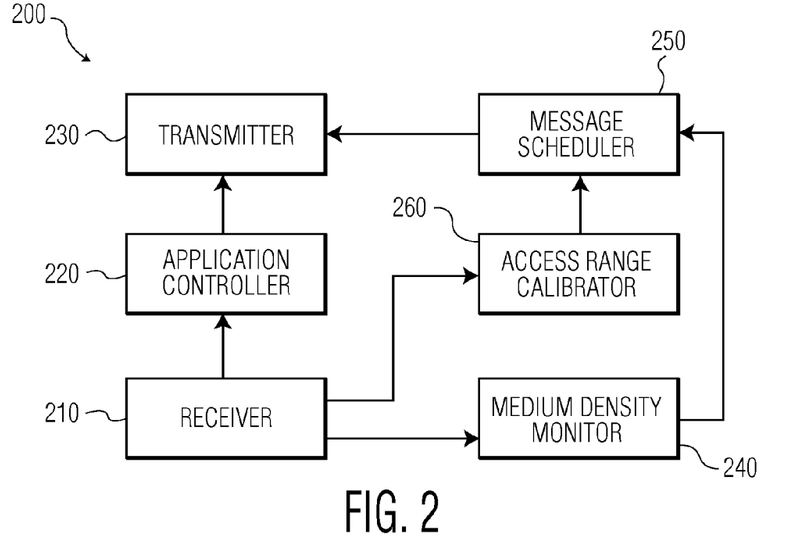
FIG. 2 illustrates a block diagram of an exemplary wireless communications device.

FIG. 2 illustrates a block diagram of an exemplary wireless communications device 200. The wireless communications device 200 may correspond to one or more of the communications devices 112, 122, 132 in the environment 100 of FIG. 1. It will be apparent that various hardware configurations may be used to implement the components of the wireless communications device 200. For example, each component may be a separate circuit or integrated circuit (IC), multiple components may be implemented together as a single IC, or one or more components may be implemented by a microprocessor configured to perform the functions described herein. Various additional modifications will be apparent.

To provide basic ITS functionality, the communications device includes a receiver 210, and application controller 220, and a transmitter 230. The receiver 210 and transmitter 230 may share one or more antennas or may be provided with one or more dedicated transmitter antennas and receiver antennas. The application controller 220 is configured to perform various functions related to the ITS application as implemented by the communications device 200. In the context of CAMs, the application controller 220 may perform at least two functions. First, the application controller 220 may receive CAMs from other wireless devices via the receiver 210 and maintain a data model of the surrounding environment based on the position and speed information reported in the CAMs. Second, the application controller 220 may periodically generate and transmit (e.g., at a rate of 10 Hz) CAM messages with current vehicle speed and position information via the transmitter 230 to other wireless devices in the area.

The medium density monitor 240 is configured to determine the current load currently being placed on the wireless communications medium. The medium density monitor 240 may use virtually any method of estimating the current load being placed on the medium. For example, the medium density monitor 240 may monitor the CAMs received by the receiver 210 to determine how many different transmitters are currently in the area. Alternatively, the medium density monitor 210 may monitor the number or proportion of "medium busy" messages returned by the transmitter 230. Various alternative or complementary methods for determining a current medium channel load will be apparent.

The message scheduler 250 is configured to modify the transmitter settings 230 to effect transmission of CAMs according to different modulation schemes. For example, during periods where the medium density monitor 240 reports that the communications medium is relatively uncongested, the message scheduler 250 may set the transmitter 230 to transmit according to a long-range modulation scheme, such as 1/2 coding rate BPSK, and refrain from changing this setting, such that all CAMs are transmitted according to this scheme. When the medium density monitor 240 reports a relatively high load on the wireless medium, the message scheduler 250 may select a pattern for transmission according to different modulation schemes appropriate for the current load, and periodically configure the transmitter 230 to transmit according to the next scheme indicated by the pattern such that the CAMs are transmitted according to the pattern of modulation schemes. This functionality may be effected in virtually any manner. For example, the message scheduler 250 may be configured to simply change the settings of the transmitter with the same periodicity that the application controller 220 transmits CAMs, the application controller 220 may send each generated CAM to the message scheduler 230 rather than the transmitter 230 such that the message scheduler 250 can forward the CAM and appropriate modulation settings to the transmitter 230 at the same time, or the message scheduler 250 may configure the transmitter 230 with the full transmission pattern where the transmitter 230 is configured to step through the pattern and use the indicated modulation scheme for each outgoing CAM. Various alternative configurations will be apparent.

Various embodiments, such as embodiments that utilize an adaptive approach to optimizing the selected transmission pattern, may also include an access range calibrator 260 configured to determine the current transmission ranges for various modulation schemes. For example, the access range calibrator 260 may operate in a passive mode by monitoring received CAM messages, calculating the distance from the communications device 200 to the position reported in the CAM, and noting the modulation scheme that was used for the initial transmission. For example, if the access range calibrator 260 receives a CAM message that was demodulated by the receiver using BPSK and that indicates presence of a vehicle 50 feet away, the access range calibrator 260 may infer that, in the current environment, BPSK modulation will give a transmission range of at least 50 feet.

Additionally or alternatively, the access range calibrator 260 may operate in an active mode where the access range calibrator 260 transmits special messages via the transmitter 230 to other wireless communications devices to test each modulation scheme. For example, the access range calibrator may broadcast a simple "ping" message according to each possible modulation scheme and note the positions reported in the responses to each ping message. The message scheduler 250 may then use the access range calibrator's 260 report as to current ranges for each modulation scheme to determine which modulation schemes should be used for a particular pattern.

Figure 3:
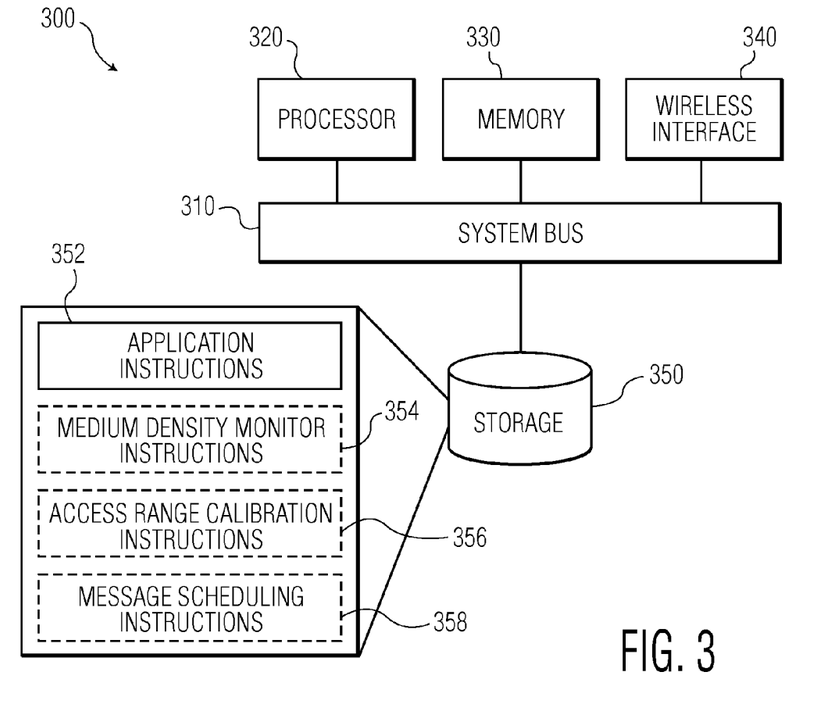
FIG. 3 illustrates a hardware diagram of an exemplary wireless communications device.

FIG. 3 illustrates a hardware diagram of an exemplary wireless communications device 300. The exemplary device 300 may correspond to any of the wireless communications devices 112, 122, 132 of FIG. 1 or the wireless communications device 200 of FIG. 2. As shown, the device 300 includes a processor 320, memory 330, wireless interface 340, and storage 350 interconnected via one or more system buses 310. It will be understood that FIG. 3 constitutes, in some respects, an abstraction and that the actual organization of the components of the device 300 may be more complex than illustrated.

The processor 320 may be any hardware device capable of executing instructions stored in the memory 330 or the storage 360. As such, the processor may include a microprocessor, field programmable gate array (FPGA), application-specific integrated circuit (ASIC), or other similar devices.

The memory 330 may include various memories such as, for example L1, L2, or L3 cache or system memory. As such, the memory 330 may include static random access memory (SRAM), dynamic RAM (DRAM), flash memory, read only memory (ROM), or other similar memory devices.

The wireless interface 340 may include one or more devices for enabling communication with other hardware devices via a wireless communications medium. For example, the wireless interface 340 may include one or more antennas, reception circuitry capable of signal demodulation according to various schemes, transmission circuitry capable of signal modulation according to various schemes, and one or more protocol stacks. In some embodiments, the wireless interface 340 includes the receiver 210 and transmitter 230 of the exemplary device 200 of FIG. 2. In some embodiments, the wireless interface 340 may additionally include the medium density monitor 240, message scheduler 250, or access range calibrator 260 of the exemplary device 200 of FIG. 2 while, in other embodiments, the processor 320 may perform at least some of the functions described above with respect to those components. Various alternative or additional hardware or configurations for the network interface 340 will be apparent.

The storage 350 may include one or more machine-readable storage media such as read-only memory (ROM), random-access memory (RAM), magnetic disk storage media, optical storage media, flash-memory devices, or similar storage media.

For example, as shown, the storage 350 stores application instructions 352 for defining the various functions to be performed by the processor 320 to implement the ITS application. For example, the application instructions 352 may include instructions for processing received CAMs and for broadcasting a series of CAMs via the wireless interface 340. Further, in embodiments wherein the processor 320 implements the medium density monitor 240, access range calibrator 260, or message scheduler 250, the storage 350 may store medium density monitor instructions 354, access range calibration instructions 356, or message scheduling instructions 358, respectively. Alternatively some or all of these functions may be performed partially or fully in hardware.

It will be apparent that various information described as stored in the storage 350 may be additionally or alternatively stored in the memory 330. In this respect, the memory 330 may also be considered to constitute a "storage device." Various other arrangements will be apparent. Further, the memory 330 and storage 350 may both be considered to be "non-transitory machine-readable media." As used herein, the term "non-transitory" will be understood to exclude transitory signals but to include all forms of storage, including both volatile and non-volatile memories.

While the device 300 is shown as including one of each described component, the various components may be duplicated in various embodiments. For example, the processor 320 may include multiple microprocessors that are configured to independently execute the methods described herein or are configured to perform steps or subroutines of the methods described herein such that the multiple processors cooperate to achieve the functionality described herein.

Figure 4:
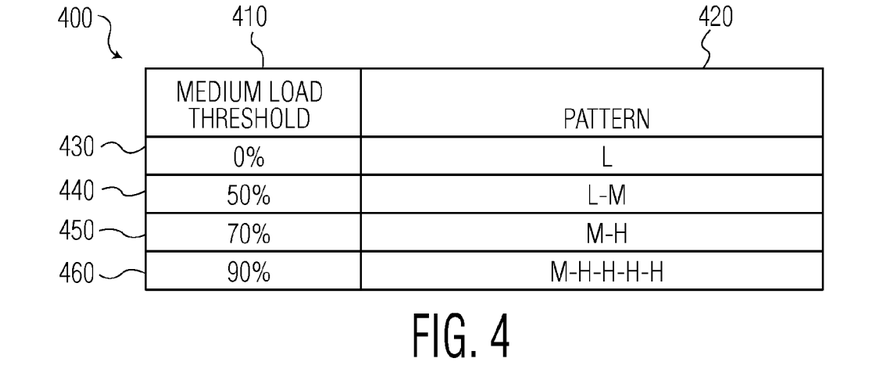
FIG. 4 illustrates an exemplary lookup table for storing predetermined message transmission patterns.

According to various embodiments, the wireless communications devices may select, for a given medium load, a pregenerated message transmission pattern associated with that load. For example, in some such embodiments, the communications device may utilize a lookup table. FIG. 4 illustrates an exemplary lookup table 400 for storing predetermined message transmission patterns. The table 400 may be stored in any storage device such as, for example, the memory 330 or storage 350 of the communications device 300 of FIG. 3 or in a separate memory that is on-chip with or otherwise accessible to the message scheduler 250 of FIG. 2.

As shown, the lookup table 400 includes a medium load threshold field 410 for indicating a threshold past which the associated pattern will be applicable, and a pattern field 420 indicating a message modulation pattern to be used when transmitting a series of messages, such as a sequence of CAMs. As an example, lookup entry 430 indicates that when the current channel load is above 0% (and not above the remaining thresholds), a repeating pattern of "L" should be used, indicating that, as a default (i.e., when the lowest non-zero threshold is not met), all CAMs should be transmitted according to a low data rate (and long range) data modulation scheme such as 1/2 coding rate BPSK. In various embodiments, the "L" character may be statically associated with a specific modulation scheme such that "L" always refers to the same modulation scheme. In other embodiments employing adaptive methods, the modulation scheme associated with the "L" character may change with the environment. For example, the "L" character may be associated with a specific transmission range and a modulation scheme may be selected to provide the specific transmission range based on the findings of the access range calibrator 260 of FIG. 2.

Various modifications will be apparent. For example, different representations of patterns may be used such as patterns that specify indices that may be associated with different modulation schemes or patterns that explicitly identify the modulation scheme to be used. As another example, different metrics for expressing channel load may be utilized other than a percentage such as a number of transmitters in the area or a measure of local interference and noise.

As another example, lookup entry 440 indicates that, once the channel load reaches 50% (but not any of the higher thresholds), the repeating pattern "L-M" should be used, indicating that every other CAM should be sent according to a middle rate (and mid-range) modulation scheme. As with the "L" character, the "M" character may be statically or dynamically linked to a specific modulation scheme.

Exemplary lookup entry 450 indicates that once the channel load reaches 70% (but not any of the higher thresholds), the repeating pattern "M-H" should be used, indicating that half of the CAMs should be sent according to the middle rate (and mid-range) modulation scheme and that the other half of the CAMs should be sent according to a high data rate (and low-range) modulation scheme. As with the "L" character, the "H" character may be statically or dynamically linked to a specific modulation scheme. Thus, this pattern provides for the use of three different modulation schemes, thereby creating three distinct regions around the vehicle that are each associated with a different rate of CAM reception. For example, the "L" character may be associated with 1/2 coding rate BPSK, the "M" character may be associated with 1/2 coding rate 16-QAM, and the "H" character may be associated with 3/4 coding rate 16-QAM. It will be apparent that various alternative embodiments may provide for patterns that include fewer or greater number of different modulation schemes. For example, a pattern "1-2-3-4-5" may provide for sending CAMs according to five different modulation schemes.

As a final example, the lookup entry 460 shows that when the medium load reaches 90 or above, the modulation scheme "M-H-H-H-H" should be used. As such, in the outer region, none of the CAMs sent will be received; in the middle region, one in every five CAMs sent will be received, and in the inner region, all CAMs should theoretically be received. Various other useful patterns and associated load thresholds will be apparent.

Figure 5:
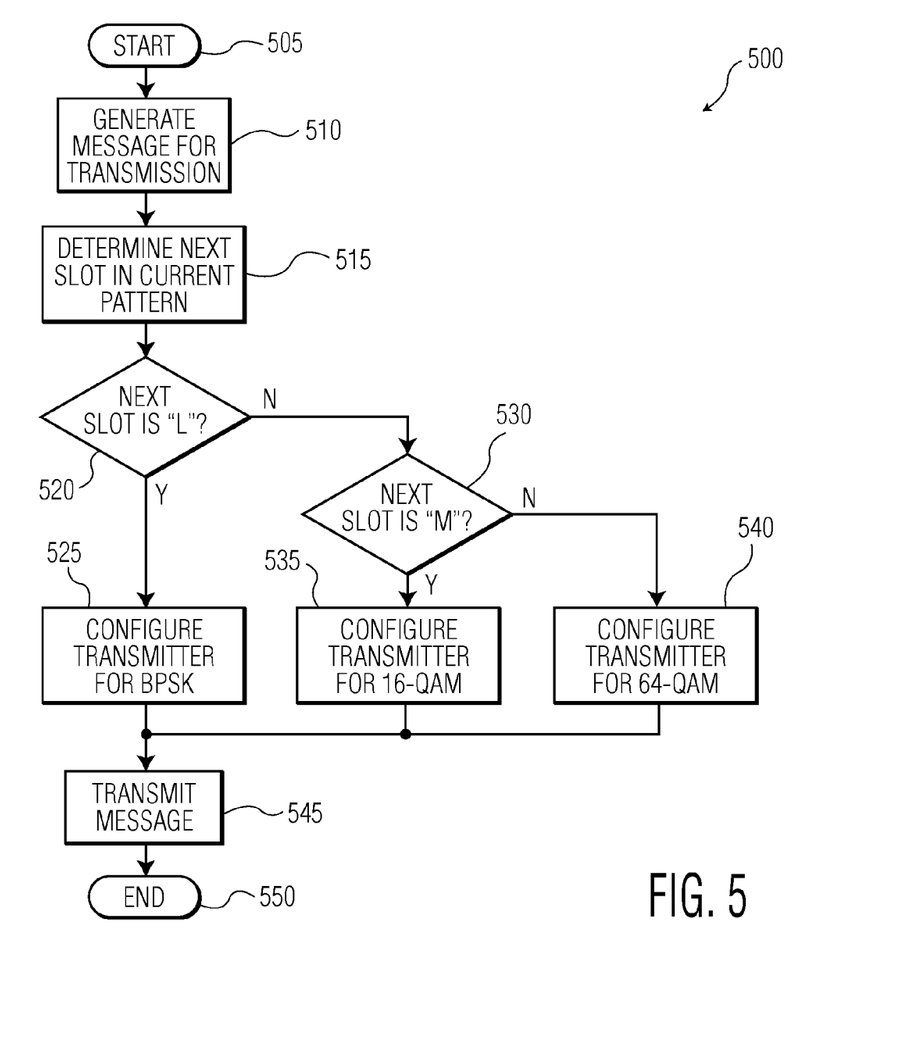
FIG. 5 illustrates an exemplary method for transmitting messages according to a transmission pattern.

After a pattern is selected, the transmission device uses the pattern to direct the modulation of each outgoing CAM. FIG. 5 illustrates an exemplary method 500 for transmitting messages according to a transmission pattern. The method 500 may be performed by the processor 320 of FIG. 3, the application controller 220, the transmitter 230, or the message scheduler 250 of FIG. 2.

The method begins in step 505 and proceeds to 510 where the communications device generates a message, such as a CAM, for broadcast or other transmission. Next, in step 515, the device determines the next slot in the current transmission pattern. For example, in various embodiments, the device may maintain a position pointer that points to the next position in the pattern and is incremented (with wrapping back to the beginning when the end of the pattern is reached) upon each CAM transmission. Various other methods for stepping through a pattern will be apparent.

The device then determines in step 520 whether the next slot carries the "L" character. If the next slot includes the "L" character, the method 500 proceeds to step 525 where the device configures the transmitter to use the BPSK modulation scheme. Otherwise, the method 500 proceeds to step 530 where the device determines whether the next slot carries the "M" character. If the next slot includes the "M" character, the method 500 proceeds to step 535 where the device configures the transmitter to use the 16-QAM scheme. Otherwise, the device assumes the next slot carries the "H" character and the method proceeds from step 530 to step 540 where the device configures the transmitter to use the 64-QAM scheme. After the transmitter has been configured, the method proceeds to step 545 where the CAM or other message is transmitted according to the configured modulation scheme. The method then proceeds to end in step 545.

As noted above, various embodiments may enable fewer or greater number of modulation schemes within a pattern. Various modifications to method 500 to enable such alternative embodiments will be apparent. For example, additional decision blocks similar to steps 520, 530 may be added along with associated configuration steps similar to steps 525, 535, 540. As another example, the decision steps 520, 530 may be replaced with an access to another lookup table that correlates the symbol read from the pattern to the appropriate modulation scheme. As yet another example, the steps 520-540 may be replace with simply reading a modulation scheme identification from the pattern and configuring the read modulation scheme. In some embodiments, the transmitter may be configured for different modulation schemes by storing a value associated with the desired modulation scheme in a special register of the transmitter circuitry. In such embodiments, steps 520-540 may be replaced with a single step that copies a value from the pattern directly into such a special register.

Figure 6:
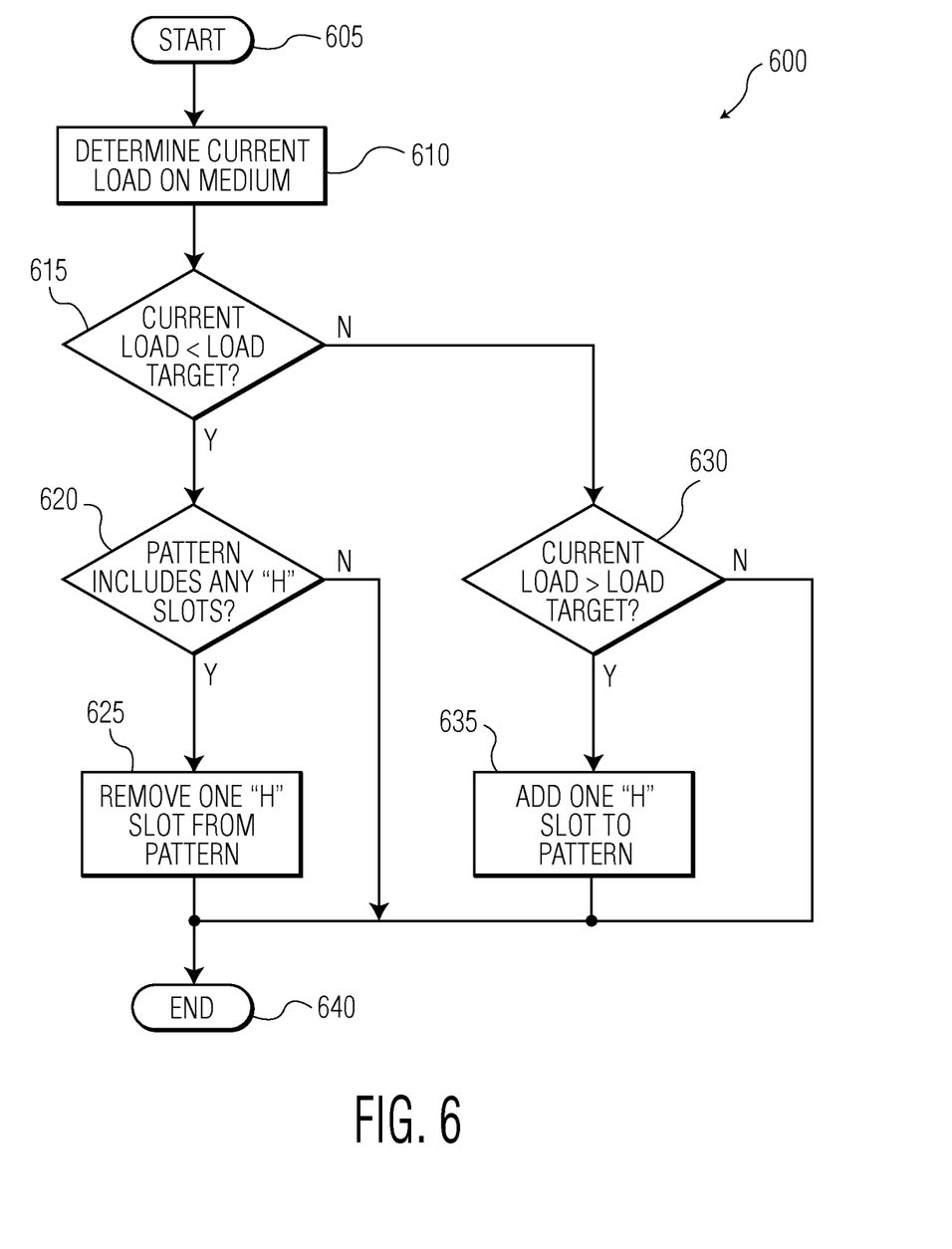
FIG. 6 illustrates an exemplary method for adapting a message transmission pattern to hone in on a medium load target.

In various embodiments, the communications device may alternatively or additionally adapt the transmission pattern based on environmental conditions. FIG. 6 illustrates an exemplary method 600 for adapting a message transmission pattern to hone in on a medium load target. The method 600 may be performed by the medium density monitor 240 or message scheduler 250 of FIG. 2 or the processor 320 of FIG. 3. The device may execute the method 600 periodically to tune the pattern, such as for each outgoing CAM or at a predetermined rate (e.g., 1, 10, or 100). Alternatively, the method 600 or a similar method may be configured for execution based on occurrence of an event such as, for example, a change in the detected medium load, such a change exceeding a predetermined threshold, or the current load changing to a value that is not within a predetermined range of a target load. Various other modifications will be apparent.

The method begins in step 605 and proceeds to step 610 where the device estimates or otherwise determines the current load on the wireless medium. Next, in step 615, the device compares the current load to a predetermined load target. For example, the device may be configured with a load target of 50% and will therefore apply the method 600 to attempt to "hone in" on a 50% medium load. In some alternative embodiments, the device may place a "dead zone" around the target wherein sufficiently close values are considered equal to the load target. For example, some such embodiments may consider the determined load to be equal to the load target when the determined load is within 5% or another predetermined margin value of the load target. In other embodiments, multiple load targets may be used, for example, to determine which pattern adjustment is appropriate for a given medium condition.

If the current load is determined to be less than the load target, the method 600 may proceed to step 620 where the device will attempt to adjust the pattern to utilize the availability of the medium to transmit a greater proportion of CAMs according to a longer-range modulation scheme. In step 620, the device determines whether the current pattern includes any "H" slots, indicating transmission of a CAM according to a high-rate (and low-range) modulation scheme. If the current pattern does include an "H" slot, the method proceeds to step 625 where one "H" slot is removed from the pattern, thereby increasing the proportion of CAMs that will be transmitted according to longer range modulation schemes. When multiple "H" slots exist in the pattern, the selection of which "H" slot to remove may be made according to any method. For example, the first encountered "H" slot may be removed, the "H" slot that is closest to another "H" slot may be removed, or "H" slots may be removed in a predetermined order. Removal of the "H" slot may be effected by complete removal of the slot from the pattern thereby shortening the pattern or by "downgrading" the H slot to a lower rate symbol such as, for example, an "L" slot. If, on the other hand, the pattern does not include any "H" slots, the device may determine that the pattern already fully utilizes the wireless medium availability for the purposes of the ITS application. As such, the method 600 may proceed directly from step 620 to end in step 640. In various alternative embodiments, such as embodiments where the method 600 additionally adds and removes "M" slots, the method may instead proceed from step 620 to another set of steps for removing an available "M" slot. Various additional modifications will be apparent.

If the device determines that the current load is not less than the load target in step 615, the method 600 proceeds to step 630 where the device determines whether the current load is greater than the load target. If the current load is substantially equal to the load target (e.g., within a "dead zone" defined for the load target, or equivalent to the load target), the method 600 may proceed directly to end in step 640. Otherwise, the device may take steps to reduce the load placed on the medium. For example, in step 635, the device may add one "H" slot to the current pattern. The selection of a location for the new "H" slot may be made according to any method. For example, the "H" slot may be appended to the end of the pattern, placed at a position that is farthest from any existing "H" slot in the pattern, or placed according to a predetermined order. "H" slot placement may be effected by adding a new slot to the pattern thereby increasing the pattern length or by "upgrading" an existing slot (e.g., an "L" slot) to an "H" slot. In various alternative embodiments, the method 600 may include additional steps to determine whether and where to place different slots such as, for example, "M" slots. Various additional modifications will be apparent. After modifying the pattern in step 635, the method 600 proceeds to end in step 640.

Various embodiments herein may implement the described methods as complete solutions to handling congestion of a wireless medium while other embodiments may implement the methods along with other congestion handling methods. For example, in various embodiments, after or while adjusting the pattern, the device may adjust the CAM transmission rate downward. For example, in an embodiment using the pregenerated pattern lookup table of FIG. 4, if the medium congestion rate remains high (e.g. 70%) after implementing the transmission pattern of entry 460, the device may reduce CAM transmission rate from 10 Hz to a lower value to further reduce the load placed on the medium. As another method, devices in various embodiments may attempt to transmit all CAMs according to a different modulation scheme before or after resorting to using a transmission pattern. For example, upon detecting medium congestion, the device may switch from transmitting all CAMs according to BPSK to transmitting all CAMs according to QPSK. If the medium remains congested, the device may then switch to pattern-based transmission.

It will also be apparent that the various methods described herein are applicable to other applications outside of CAM transmission and ITS applications. For example these methods may be applied to mobile phones and other devices, wireless monitoring systems and applications, safety monitoring or warning applications within the "Internet of Things," wireless advertising and information broadcasting systems, and other applications. Generally, the methods presented herein are applicable to virtually any system utilizing wireless communications and more particularly, but not exclusively, to any system utilizing devices that transmit periodic messages such as "heartbeat" messages.

According to the foregoing, various embodiments enable intelligent use of a wireless communications medium in periods of congestion. In particular, by tuning the modulation scheme used for messages being transmitted, the load placed on the medium may be reduced, particularly at locations that are farther from the transmitting device, without reducing reliability of transmission to devices that are closer to the transmitting device. Various additional benefits will be apparent in view of the foregoing.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A non-transitory machine-readable medium encoded with instructions for execution by a wireless communications device for transmitting a series of messages, comprising:
   instructions for generating, by the wireless communications device, a first message having a message type and associated with an application;
   instructions for transmitting the first message toward at least one other device via a wireless communications medium according to a first modulation scheme, wherein the first modulation scheme is chosen based on a modulation scheme pattern, wherein the modulation scheme pattern selects a modulation scheme appropriate for a current load percentage range which includes the first modulation scheme for the first message and a second modulation scheme which is a different scheme from the first modulation scheme for a second message:
instructions for generating, by the wireless communications device, the second message having the message type associated with the application, the first message and the second message having the same message type;
instructions for transmitting the second message toward the at least one other device via the wireless communications medium according to a second modulation scheme that is different from the first modulation scheme, wherein the second modulation scheme is chosen based on the modulation scheme pattern.

2. The non-transitory machine-readable medium of claim 1, wherein the application is an intelligent transportation system.

3. The non-transitory machine-readable medium of claim 1, wherein the first and second modulation schemes are both selected from the group consisting of: binary phase-shift keying, quadrature phase-shift keying, 16-value quadrature amplitude modulation (16-QAM), and 64-value quadrature amplitude modulation (64-QAM).

4. The non-transitory machine-readable medium of claim 1, further comprising:
instructions for generating, by the wireless communications device, a third message having the message type associated with the application, the first message and the third message having the same message type; and
instructions for transmitting the third message toward the at least one other device via a wireless communications medium according to a third modulation scheme that is different from the first modulation scheme and the second modulation scheme.

5. The non-transitory machine-readable medium of claim 1, wherein the second modulation scheme is selected to have a higher data rate than the first modulation scheme.

6. The non-transitory machine-readable medium of claim 1, further comprising instructions for storing the modulation scheme pattern, wherein the modulation scheme pattern indicates, for a sequence of messages of the message type, a sequence of modulation schemes to be used for transmitting respective messages from the sequence of messages, wherein:
the instructions for transmitting the first message toward at least one other device via a wireless communications medium according to the first modulation scheme are configured to be executed based on determining, from the modulation scheme pattern, that the first modulation scheme is the next modulation scheme to be used; and
the instructions for transmitting the second message toward the at least one other device via the wireless communications medium according to the second modulation scheme are configured to be executed based on determining, from the modulation scheme pattern, that the second modulation scheme is the next modulation scheme to be used.

7. The non-transitory machine-readable medium of claim 6, further comprising:
instructions for determining a current load on the wireless communications medium; and
instructions for selecting a new modulation scheme pattern based on the current load.

8. The non-transitory machine-readable medium of claim 7, wherein the instructions for selecting a new modulation scheme pattern comprise instructions for retrieving a previously defined modulation scheme pattern based on the current load.

9. The non-transitory machine-readable medium of claim 7, wherein the instructions for selecting a new modulation scheme pattern comprise:
instructions for comparing the current load to a target load; and
instructions for modifying the current modulation scheme pattern based on the outcome of comparing the current load to the target load to generate the new modulation scheme pattern.

10. The non-transitory machine-readable medium of claim 1, further comprising instructions for periodically analyzing received messages, respective modulations schemes associated with reception of the received messages, and position information carried by the received messages to determine a range associated with the first modulation scheme and the second modulation scheme in a current environment of the wireless communications device.

11. A wireless communications device for transmitting a series of messages, the wireless communications device comprising:
at least one antenna;
a transmission circuit configured to transmit data via the at least one antenna and a wireless communications medium according to any of a plurality of modulation schemes;
a reception circuit configured to receive data via the at least one antenna;
an application controller configured to generate a series of messages having a message type and associated with an application; and
a message scheduler configured to provide modulation settings to the transmission circuit for respective messages of the series of messages to be transmitted according to different modulation schemes of the plurality of modulation schemes wherein modulation schemes are chosen for transmission based on a modulation scheme pattern, whereby a first message of the series of messages is transmitted according to a first modulation scheme and a second message of the series of messages is transmitted according to a second modulation scheme, wherein the modulation scheme pattern selects a modulation scheme appropriate for a current load percentage range which includes the first modulation scheme for the first message and the second modulation scheme which is a different scheme from the first modulation scheme for the second message.

12. The wireless communications device of claim 11, wherein the application is an intelligent transportation system.

13. The wireless communications device of claim 11, wherein the first and second modulation schemes are both selected from the group consisting of: binary phase-shift keying, quadrature phase-shift keying, 16-value quadrature amplitude modulation (16-QAM), and 64-value quadrature amplitude modulation (64-QAM).

14. The wireless communications device of claim 11, wherein the message scheduler is configured to transmit messages from the series of messages according to three different modulation schemes.

15. The wireless communications device of claim 11, wherein the second modulation scheme is selected to have a higher data rate than the first modulation scheme.

16. The wireless communications device of claim 11, further comprising a memory device configured to store the modulation scheme pattern, wherein the modulation scheme pattern indicates, for the series of messages, a sequence of modulation schemes from the plurality of modulation schemes to be used for transmitting respective messages from the series of messages.

17. The wireless communications device of claim 16, further comprising a density monitor configured to determine a current load on the wireless communications medium,
   wherein the message scheduler is further configured to select a new modulation scheme pattern based on the current load and for storage in the memory device.

18. The wireless communications device of claim 17 wherein:
   at least one of the memory device and an additional memory device stores a lookup table that correlates load thresholds to respective previously-defined modulation scheme patterns; and
   in selecting the new modulation scheme pattern, the message scheduler is configured to retrieve the new modulation scheme pattern from the lookup table based on the current load as compared to at least one of the load thresholds.

19. The wireless communications device of claim 17 wherein, in selecting the new modulation scheme pattern, the message scheduler is configured to:
   compare the current load to a target load; and
   modify the current modulation scheme pattern based on the outcome of comparing the current load to the target load to generate the new modulation scheme pattern.

20. The wireless communications device of claim 11, further comprising an access range calibrator configured to periodically analyzing received messages received via the reception circuit, respective modulations schemes associated with reception of the received messages, and position information carried by the received messages to determine a range associated with the first modulation scheme and the second modulation scheme in a current environment of the wireless communications device.

* * * * *